Aug. 29, 1950 — L. F. JONES — 2,520,600
AIR TRAFFIC CONTROL
Filed March 13, 1948 — 2 Sheets-Sheet 1
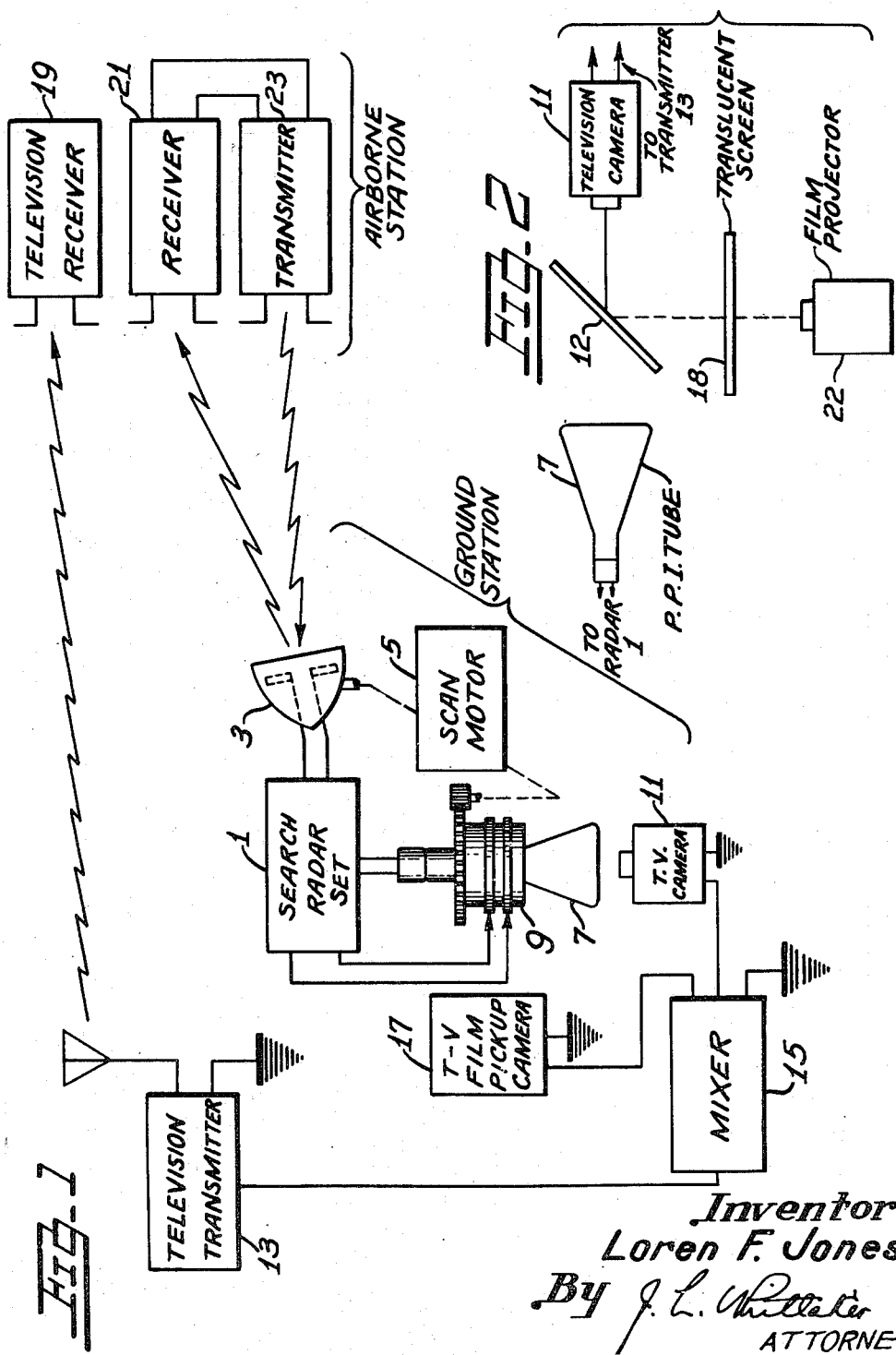
Inventor:
Loren F. Jones
By J. L. Whittaker
ATTORNEY Inventor:
Loren F. Jones
By J. L. Whittaker
Attorney Patented Aug. 29, 1950

2,520,600

UNITED STATES PATENT OFFICE 2,520,600

AIR TRAFFIC CONTROL

Loren F. Jones, Philadelphia, Pa., assignor to Radio Corporation of America, a corporation of Delaware Application March 13, 1948, Serial No. 14,715

13 Claims. (Cl. 343—6)

This invention relates to air traffic control, and its principal object is to provide an improved method of and means for directing and coordinating the movements of a plurality of aircraft which are to use identical or converging flight paths.

Another object of this invention is to provide an air traffic control system which requires no computations on the part of either aircraft personnel or ground station personnel.

A further object is to provide a traffic control system of the described type which enables the use of airport runways to the fullest extent but requires a minimum of voice communication between the ground station and the aircraft.

Figure 3:
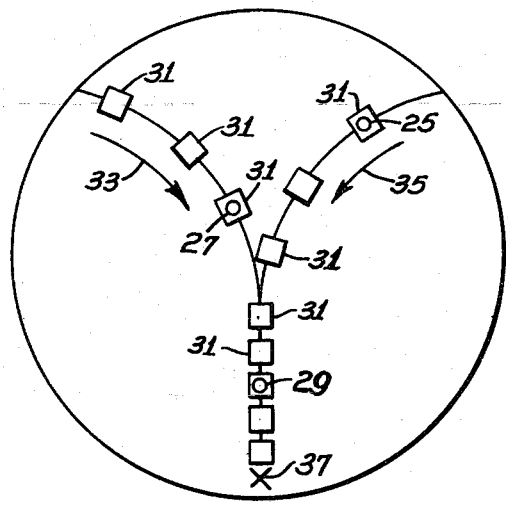
Figure 4:
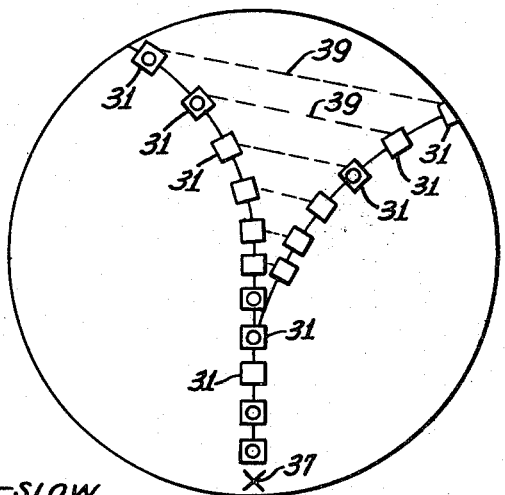
Figure 5:
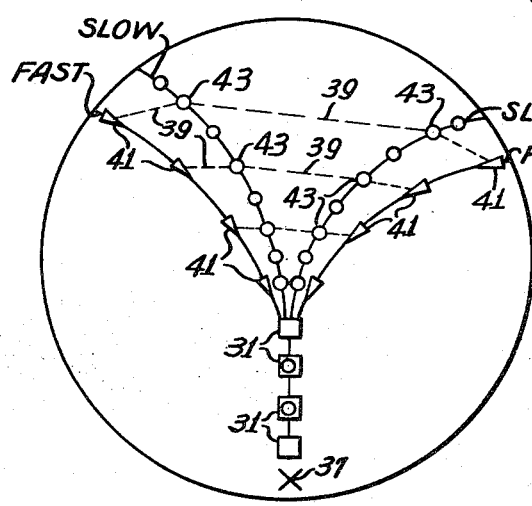

The invention will be described with reference to the accompanying drawings, wherein:

Figure 1 is a schematic block diagram showing the ground station equipment and the apparatus carried by one aircraft in the practice of the present invention, Figure 2 illustrates a modification of the system of Figure 1, Figure 3 shows a typical display provided in the operation of the system of Figure 1, and Figures 4 and 5 represent other typical displays which can be produced by the system of Figure 1.

In regions where air traffic is heavy, and particularly in the vicinity of an airport, it is preferable to control the movements of each craft with reference to those of the others. Usually certain prescribed flight paths are set up for approach and departure maneuvers. Coordination between the various aircraft is maintained by a ground based control station, which must receive more or less continuous information as to the current positions and flight paths of the aircraft, and instruct the flight personnel from time to time as changes in course or other maneuvers are required.

It has been customary for the aircraft to report their positions, intended maneuvers, and so on to the ground station by radiophone, and for the ground station to send commands to the aircraft by radiophone. This procedure involves delay, particularly when traffic is congested. Moreover, the entire responsibility of coordination is placed upon the ground station personnel. The rate at which traffic can be handled is definitely limited by the fact that each craft must be dealt with individually by an operator at the ground station. It is technically possible to have the foregoing functions performed automatically, by relatively complex equipment. However, the present invention provides a method for achieving similar results without automatic computers or other expensive and complicated equipment.

According to the present invention, a ground based search radar and television relay system, like that described and claimed in co-pending United States patent application, Serial No. 607,999½ filed July 31, 1945, by L. F. Jones, and entitled Radio Navigation System, is used to provide each aircraft with a visual display which shows its position with respect to the ground station and other aircraft in the service area. A motion picture is superimposed on the radar display, depicting moving blocks or air spaces which can be occupied by an aircraft without interfering with aircraft in other similar airspaces.

Referring to Figure 1, the ground station includes a radar transmitter and receiver apparatus 1, provided with a directive antenna 3 continuously rotatable in azimuth by a motor 5, and a cathode ray indicator tube 7. The tube 7 has a rotatable deflection yoke 9 which is driven by the motor 5 in synchronism with the antenna 3. The structure thus far described is a search or surveillance radar of the so-called "PPI" (plan position indicator) type, substantially like those used in military operations for detecting aircraft or other reflecting objects, except that the transmitter and receiver preferably, though not neccessarily, are arranged to operate at somewhat different frequencies.

A television camera 11 is placed so as to pick up the image of the screen of the cathode ray tube 7. The video output of the camera 11 is supplied to a television transmiter 13, through a mixer 15. A television film pickup camera 17, of the type used in television entertainment broadcasting with motion picture films, has its video output applied to the transmitter 13, also by way of the mixer 15. The motion picture film for the film pickup camera 17 carries a display consisting of moving geometrical figures or "blocks," each representing an airspace for the exclusive use of a single aircraft.

Each aircraft intended to use the facilities of the present system carries a television receiver 19, designed to respond to the ground station transmitter 13. Each airborne station may, as in the present example, also include a "transponder" beacon, comprising a receiver 21 tuned to respond to the ground station radar transmitter, and a transmitter 23 which operates at the same frequency as the ground station radar receiver. The output of the receiver 21 is applied to the transmitter 23, so that the beacon produces a response to each signal received by it from the ground radar.

In the operation of the described system, the radar set 1 produces a pulse-modulated signal which is radiated in a narrow beam by the antenna 3. This beam scans continuously in azimuth, owing to rotation of the antenna by the motor 5. An aircraft within the operating range of the ground station will intercept the beam once during each rotation of the antenna, reflecting some of the energy back toward the ground station. This reflected energy may be picked up by the antenna 3, demodulated and amplified by the radar receiver, and applied to the beam intensity control electrode of the cathode ray tube 7.

The yoke 9, energized in synchronism with the pulse modulation of the radar transmitter and rotated in synchronism with the antenna 3, deflects the cathode ray beam to periodically scan the fluorescent screen of the tube 7. This results in a map-like display or plan position indication on the screen, wherein reflecting objects such as aircraft are represented by luminous spots or "pips."

In order to distinguish aircraft from other reflecting objects, such as irregularities on the surface of the earth, it is preferable, although not essential, to use the airborne beacon with the transmitter 23 operating at a different frequency from the receiver 21. The operation of the ground radar apparatus will be substantially the same as described above, except that its receiver will respond only to the airborne beacon transmissions and not to the reflected signals. This type of operation provides a display on the tube 7 which is free of "ground clutter" and other extraneous matter, showing only "pips" which represent the aircraft carrying beacons. Furthermore, the beacon receiver may be used to control the television receiver for purpose of self-identification of the aircraft, in the manner described in said co-pending patent application Serial No. 607,999½.

The television camera 11 produces a video signal representing the PPI display which appears on the tube 7. The film pickup camera 17 supplies a video signal corresponding to the moving block display on the film. The two video signals are mixed in the mixer 15 to provide a composite signal which modulates the transmitter 13 and is broadcast.

Each airborne television receiver 19 within range responds to the transmitter 13 and provides a visual display corresponding to the composite video signal from the mixer 15. This display shows both the "pips" on the radar display and the moving blocks on the motion picture film, and may also show other information as described in the aforementioned Jones application. Figure 3 shows a simple example of the type of composite display provided by the airborne television receiver. The radar-derived portion of the display comprises pips 25, 27, and 29, representing three different aircraft. The blocks 31 in Figure 3 are produced from the motion picture film, and move as indicated by the arrows 33 and 35 at speeds corresponding to the normal speeds of the aircraft involved. In this example it is assumed that all of the aircraft have similar speed characteristics.

Two flight paths are shown, adjacent the arrows 33 and 35, merging into a single path which may be, for example, the glide path to be followed by aircraft approaching for a landing at the point marked by the cross 37 in Figure 3. The blocks interleave at the intersection of the two paths, each block from each path being preceded and followed by blocks from the other path. The blocks are nearer to each other on the approach path, owing to slower motion of the aircraft as a result of lowering flaps and wheels in preparation for landing. To maintain an orderly pattern of traffic, it is only necessary that each pilot fly his aircraft so as to maintain the corresponding pip within one of the blocks not already occupied by another. Conflicts between aircraft thus are avoided without the necessity of observation or instruction by the ground station personnel.

Since only aircraft at relatively low altitude will be of interest when the described system is used for landing purposes, it may be desirable to eliminate from the radar display any "pips" representing aircraft at relatively high altitudes, for example, those en route on an airway passing over the ground station. This may be done simply by designing the radar antenna to provide low vertical directivity, or by controlling the airborne responder beacon by an altimeter. For example, the beacon may be disabled automatically when the altitude is greater than 1,000 feet. In more complex systems, where radar and television relay is used for navigation as well as for landing purposes, the airborne beacon may be coded according to altitude as described in copending U. S. application Serial No. 725,206 filed January 30, 1947 by Philip J. Herbst, and entitled "Traffic Control System, now Patent No. 2,490,268 granted Dec. 6, 1949.

The moving block pattern shown in Figure 3 is suitable when the traffic is about equal on the different arrival paths. If the traffic is unequal, the runway cannot be used to saturation because all of the blocks on one path will be occupied before those on the other path are full, resulting in gaps in the flow of traffic along the merged approach path. Saturation operation can be maintained independently of the traffic distribution by providing a block on each arrival path for each landing interval, as shown in Figure 4. In this case each block on each arrival path is connected by a line 39 (on the motion picture) with a corresponding block on each other arrival path. The blocks connected to each other by any one line 39 arrive together at the junction of the arrival paths, where they are replaced by a single block on the landing path.

With the type of moving block pattern shown in Figure 4, the pilot of an aircraft may select any block which is unoccupied and not connected by one of the lines 39 to an occupied block. Thus when traffic is heavy on one approach path and light on another, all of the blocks on the landing path may be filled, most of them from the heavily loaded approach path. It will be apparent that any practical number of approach paths may be used, although only two are shown in Figures 3 and 4.

The display of Figure 4, like that of Figure 3, is designed on the assumption that all of the aircraft involved can fly at about the same speed. In the event that the system is to be used with a variety of aircraft whose normal flying speed ranges do not overlap, fast moving and slow moving blocks may be provided as shown in Figure 5. The triangular marks 41 represent fast blocks, and the circles 43 are slow blocks. Different types of aircraft are generally capable of holding approximately equal speeds on the final approach and landing path. Accordingly, the same blocks 31 may be used for all craft on the landing path.

The approach paths for fast and slow craft are separate to allow passing up to within a certain minimum distance from the point where the paths merge. As in the display of Figure 4, each block on each path is connected by lines 39 to corresponding blocks on other paths. It may be desirable to identify each block, to facilitate observation and control of the traffic pattern. The motion picture film may include individual identification marks such as numerals which follow each block in its motion toward the point 37. Each aircraft may be assigned by the ground controller to a certain numbered block, within which the pilot keeps his craft.

A number of different motion picture films are provided, each made specifically for a certain runway at the airport, and preferably also for different wind conditions. The film is changed as necessary to accommodate variations in wind direction and velocity.

Figure 2 shows a modification of the system of Figure 1, using optical rather than electronic mixing of the radar and motion picture displays. A semi-reflecting surface 12, such as a half silvered or a dichroic mirror, is located diagonally between the cathode ray tube 7 and the camera 11. An ordinary motion picture projector 22 is focussed on a translucent screen 18, which is placed so that the projected motion picture image will be superimposed, by reflection on the mirror 12, upon the radar display. The television camera 11 then provides a composite video signal similar to that provided in the system of Figure 1 by the mixer 15. The system of Figure 2 has the advantage of requiring only one television deflection system, while that of Figure 1 requires the deflection patterns of the cameras 11 and 17 to be maintained in register.

Although the above-described system employs surveillance radar for the purpose of providing a map-like display of the ground station, it will be apparent to those skilled in the art that the practice of the invention is not limited thereto. The distance and direction of each aircraft from the ground station could be determined by other known means such as by triangulation with direction finders or by means of an omnidirectional radio range and radio distance measuring equipment. The positional information may be converted to a map-like display either by automatic equipment or by operating personnel at the ground station.

Summarizing briefly, the invention has been described as an improvement in the art of air traffic control. A map-like display showing the positions of aircraft in the vicinity of a ground based control station is combined with a motion picture showing a plurality of moving blocks, each representing an airspace which can be occupied by one craft. The combined picture is broadcast by television to all the aircraft. Thus each pilot is enabled to fly his craft so as to maintain the radar indication or "pip" which corresponds to his craft within one of the blocks.

I claim as my invention:

1. An air traffic control system including, at a ground station, means providing a map-like indication of the positions of aircraft within the service area of said station, and means for reproducing said indication on board said aircraft, means at said ground station producing a display including a plurality of characteristic marks which move at rates corresponding to typical aircraft ground speeds and represent individual moving airspaces each of which can be occupied by an aircraft without interference with an aircraft in another of said airspaces, and means superimposing said display upon said map-like indication for transmission to and reproduction on board said aircraft.

2. The invention as set forth in claim 1, wherein said characteristic marks move in paths corresponding to prescribed lines of flight for aircraft in said service area.

3. The invention as set forth in claim 2, wherein certain of said paths merge or intersect, including lines in said display connecting those of said marks representing groups of airspaces which become coincident upon merging or intersection of the respective paths along which they move.

4. The invention as set forth in claim 2, wherein said marks representing airspaces are of characteristic shapes which represent their respective rates of motion.

5. An air traffic control system including at a ground station, means providing a visual display in the form of a map-like indication showing the positions of aircraft within the service area of said station as spots in said display; transmitter means at said ground station and receiver means on board said craft for reproducing said display on said craft; a motion picture reproducing device at said ground station, and means combining the motion pictures reproduced by said device with said map-like display, whereby said motion pictures are reproduced on said aircraft in superposition upon said display; and motion picture film for reproduction by said reproducing device, said film bearing characteristic marks representing respective airspaces, moving at rates corresponding to typical aircraft ground speeds and separated from each other by distances corresponding to a minimum desired separation between any of said aircraft.

6. An air traffic control system including, at a ground station, radar means providing a visual display in the form of a map-like indication showing the positions of aircraft within the service area of said station as spots in said display; television transmitter means at said ground station and television receiver means on board said craft for reproducing said display on said craft; a motion picture reproducing device at said ground station, and means combining the motion pictures reproduced by said device with said radar display, whereby said motion pictures are reproduced on said aircraft in superposition upon said radar display; and motion picture film for reproduction by said reproducing device, said film bearing characteristic marks representing respective airspaces, moving at rates corresponding to typical aircraft ground speeds and separated from each other by distances corresponding to a miniumum desired separation between any of said aircraft.

7. An air traffic control system including, at a ground station, search radar apparatus providing a plan position indication of aircraft within the service area of said station, and television means for reproducing said indication on board said aircraft, means at said ground station producing a display including a plurality of characteristic marks which move at rates corresponding to typical aircraft ground speeds and represent individual moving airspaces each of which can be occupied by an aircraft without interference with an aircraft in another of said airspaces, and means superimposing said display upon said radar indication for transmission to and reproduction on board said aircraft.

8. A traffic control system including apparatus providing an indication of the positions of mobile craft within a service area, means producing a display including a plurality of characteristic marks which move at rates corresponding to typical speeds of said craft and represent individual moving spaces each of which can be occupied by one of said craft without interference with a craft in any other of said moving spaces, and means superimposing said display upon said positional indication.

9. An air traffic control system including at a ground station, radar means providing a visual display in the form of a map-like indication showing the positions of aircraft within the service area of said station as spots in said display; television transmitter means at said ground station and television receiver means on board said craft for reproducing said display on said craft; a motion picture reproducing device at said ground station, and means optically combining the motion pictures reproduced by said device with said radar display, whereby said motion pictures are reproduced on said aircraft in superposition upon said radar display; and motion picture film for reproduction by said reproducing device, said film bearing characteristic marks representing respective airspaces, moving at rates corresponding to typical aircraft ground speeds and separated from each other by distances corresponding to a minimum desired separation between any of said aircraft.

10. An air traffic control system including at a ground station, radar means providing a visual display in the form of a map-like indication showing the positions of aircraft within the service area of said station as spots in said display; television transmitter means at said ground station and television receiver means on board said craft for reproducing said display on said craft; a motion picture reproducing device at said ground station, and means producing a video signal representing the motion pictures reproduced by said device and combining said video signal with that representing said display, whereby said motion pictures are reproduced on said aircraft in superposition upon said radar display; and motion picture film for reproduction by said reproducing device, said film bearing characteristic marks representing respective airspaces, moving at rates corresponding to typical aircraft ground speeds and separated from each other by distances corresponding to minimum desired separation between any of said aircraft.

11. An air traffic control system comprising at a ground station means including radio locator apparatus for producing signals representing the positions of aircraft within the service area of said station, means at said station for producing additional signals representing a facsimile of an aircourse and a plurality of characteristic marks which move therealong at rates corresponding to predetermined aircraft ground speeds and represent individual moving air spaces each of which can be occupied by an aircraft without interference with an aircraft in another of said air spaces, means at said ground station for transmitting all of said signals to said aircraft, receiver means on board said aircraft responsive to the first of said signals to produce a map-like indication showing said positions of said aircraft and responsive to said additional signals to produce said display in registry with said indication to permit viewing of the positions of the aircraft with respect to the course and to the marks.

12. An air traffic control system comprising at a ground station means including a search radar apparatus for providing signals representing a plan position indication of aircraft within the service area of the station, television-link means effective to transmit the signals to said aircraft for producing said indication on board said aircraft, means at said ground station for producing additional signals representing a facsimile of an aircourse and a plurality of characteristic marks which move therealong at rates corresponding to predetermined aircraft ground speeds and represent individual moving air spaces each of which can be occupied by an aircraft without interference from an aircraft in another of said air spaces, the television-link means being further effective to transmit said additional signals to said aircraft for producing said display on board said aircraft, and including means at the ground station for transmitting all of said signals so mixed that said display and said plan position indication when produced on said aircraft will be in appropriate registry for viewing the positions of said aircraft with respect to said aircourse and of said marks.

13. A method of controlling the movements of a plurality of vehicles in an operating area comprising the steps of obtaining at a control station information as to the positions of said vehicles; obtaining said information continuously whereby further information as to movements of said vehicles is also obtained; transmitting to said vehicles signals representing a map-like indication of the positions and movements of said vehicles in said area; receiving said signals in each of the vehicles and translating them into said indication; producing at the control station additional signals representing a facsimile of an intended path of travel for said vehicles and a plurality of characteristic marks which move along the represented path at rates corresponding to predetermined speeds for vehicles, each of said marks representing a space on said path to be occupied by no more than one vehicle, to avoid collisions or excessive congestion on the path; transmitting said additional signals to the vehicles; receiving the additional signals in each of the vehicles and translating them into said display in registry with said indication to permit viewing of the positions of any of the vehicles with respect both to said path and to a respective one of the marks representing the space on the path to be occupied by it.

LOREN F. JONES.

REFERENCES CITED

The following references are of record in the file of this patent:

RCA Review for December 1946, pp. 601 to 621, article entitled "Teleran" by Ewing and Smith.